US012793269B2

(12) United States Patent
Liao et al.

(10) Patent No.: US 12,793,269 B2
(45) Date of Patent: Nov. 10, 2026

(54) ADAPTIVE IMAGE QUALITY ADJUSTMENT OF DIFFERENT SKIN TONES

(71) Applicant: DELL PRODUCTS L.P., Round Rock, TX (US)

(72) Inventors: Chien-Chih Liao, Taipei City (TW); Ghee Beng Ooi, Singapore (SG); Chih Hao Kao, Singapore (SG)

(73) Assignee: Dell Products L.P., Round Rock, TX (US)

( * ) Notice: Subject to any disclaimer, the term of this patent is extended or adjusted under 35 U.S.C. 154(b) by 358 days.

(21) Appl. No.: 18/402,952

(22) Filed: Jan. 3, 2024

(65) Prior Publication Data

US 2025/0218043 A1 Jul. 3, 2025

(51) Int. Cl.
*G06T 7/90* (2017.01)
*G06V 10/56* (2022.01)
*G06V 40/16* (2022.01)

(52) U.S. Cl.
CPC ................ *G06T 7/90* (2017.01); *G06V 10/56* (2022.01); *G06V 40/161* (2022.01); *G06T 2207/10024* (2013.01); *G06T 2207/30168* (2013.01)

(58) Field of Classification Search
CPC ............. G06T 7/90; G06T 2207/10024; G06T 2207/30168; G06V 10/56
See application file for complete search history.

(56) References Cited

U.S. PATENT DOCUMENTS

| | | | | |
|---|---|---|---|---|
| 11,595,590 | B1 | 2/2023 | Sheikh et al. | |
| 2009/0160945 | A1* | 6/2009 | Chung ................. | H04N 5/2621 348/207.1 |
| 2012/0300050 | A1* | 11/2012 | Korichi ................... | G01J 3/462 382/165 |
| 2021/0097654 | A1* | 4/2021 | Zunjarrao ............ | H04N 23/741 |
| 2023/0118441 | A1 | 4/2023 | Kao et al. | |
| 2023/0199279 | A1 | 6/2023 | Kao et al. | |
| 2023/0206409 | A1 | 6/2023 | Peana et al. | |
| 2024/0273858 | A1* | 8/2024 | Gintsburg .............. | G06V 10/60 |

OTHER PUBLICATIONS

Celebi, M. Emre, Quan Wen, Sae Hwang, and Gerald Schaefer. "Color quantization of dermoscopy images using the k-means clustering algorithm." In Color Medical Image Analysis, pp. 87-107. Dordrecht: Springer Netherlands, 2013. (Year: 2013).*

Liu, Yang, Suk-Hwan Lee, Seong-Geun Kwon, and Ki-Ryong Kwon. "Skin-pigmentation-disorder detection algorithm based on projective coordinates." Optik 127, No. 15 (2016): 5899-5913. (Year: 2016).*

(Continued)

*Primary Examiner* — Stephen R Koziol
*Assistant Examiner* — Ashley Hytrek
(74) *Attorney, Agent, or Firm* — Larson Newman, LLP

(57) ABSTRACT

A system categorizes samples of skin tones in a color domain into zones, and in response to detecting a user's face in an image by a camera, predicts the skin tone of the user's face in the image that includes determining whether the skin tone is in one of the zones in the color domain. In response to determining that the skin tone is in a specific zone, the system tunes the image using an image quality setting associated with the corresponding skin tone prior to displaying the image.

20 Claims, 6 Drawing Sheets

(56) References Cited

OTHER PUBLICATIONS

Krishnapriya, K. S., Pangelinan, G., King, M. C., & Bowyer, K. W. (2022). Analysis of manual and automated skin tone assignments. In Proceedings of the IEEE/CVF Winter Conference on Applications of Computer Vision (pp. 429-438). (Year: 2022).*

Gao, S., Duan, H., Li, X., Fu, K., Peng, Y., Xu, Q., . . . & Zhai, G. (2024). Quality-guided skin tone enhancement for portrait photography. IEEE Transactions on Multimedia. (Year: 2024).*

* cited by examiner

ADAPTIVE IMAGE QUALITY ADJUSTMENT OF DIFFERENT SKIN TONES

FIELD OF THE DISCLOSURE

The present disclosure generally relates to information handling systems, and more particularly relates to adaptive image quality adjustment of different skin tones.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

A system categorizes samples of skin tones in a color domain into zones, and in response to detecting a user's face in an image by a camera, predicts a skin tone of the user's face in the image that includes determining whether the skin tone is in one of the zones in the color domain. In response to determining that the skin tone is in a first zone, the system tunes the image using an image quality setting associated with the light skin tone prior to displaying the image.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
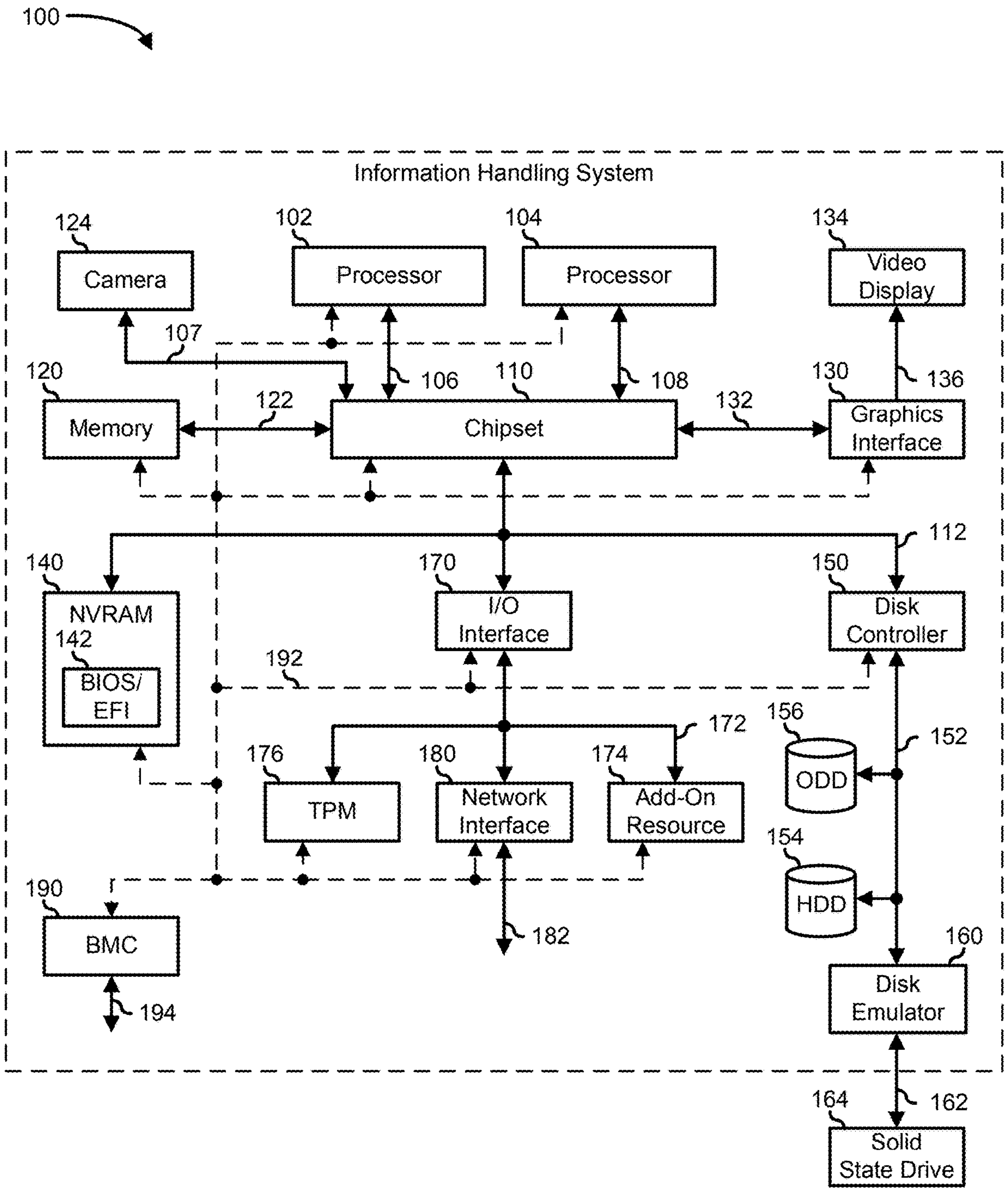
FIG. 1 is a block diagram illustrating an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM)

devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four-lane (x4) PCIe adapter, an eight-lane (x8) PCIe adapter, a 16-lane (x16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including a PCIe interface, an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board, or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172 and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth® or Bluetooth-Low-Energy (BLE) channel, a cellular-based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out of band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device, a BMC may be referred to as an embedded controller (EC). A BMC included in a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell Remote Access Controller (iDRAC).

Management interface 192 represents one or more out-of-band communication interfaces between BMC 190 and the elements of information handling system 100, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a PCIe interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a RedfishR interface), various vendor defined interfaces (such as a Dell EMC Remote Access Controller Administrator (RACADM) utility, a Dell EMC OpenManage Enterprise, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 100. An example of BMC 190 includes an iDRAC, or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple central processing units (CPUs) and redundant bus controllers. One or more components can be integrated together. Information handling system 100 can include additional buses and bus protocols, for example, $I^2C$ and the like. Additional components of information handling system 100 can include one or more storage devices that can store machine-executable code, one or more communications ports for communicating with external devices, and various input and output (I/O) devices, such as a keyboard, a mouse, and a video display. For example, information handling system 100 also includes a camera 124 that is connected to chipset 110 via an interface 107. Camera 124 may be web-based also referred to as a "webcam" and can be built into or discrete from an information handling system.

For purposes of this disclosure, information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

One common drawback of some cameras, such as webcams, is the quality of the captured images. While some cameras allow the images to be tuned, many provide a single image quality tone adjustment, which does not cover all skin tones. For example if a webcam is tuned based on a medium skin tone, then an image of a user with a dark or light skin tone may be overexposed. Similarly if the webcam is tuned based on a fair skin tone, then an image of a user with a medium or dark skin tone may be underexposed. To address this issue and other concerns, the present disclosure provides a system and method for skin tone-based image quality adjustment.

Figure 2:
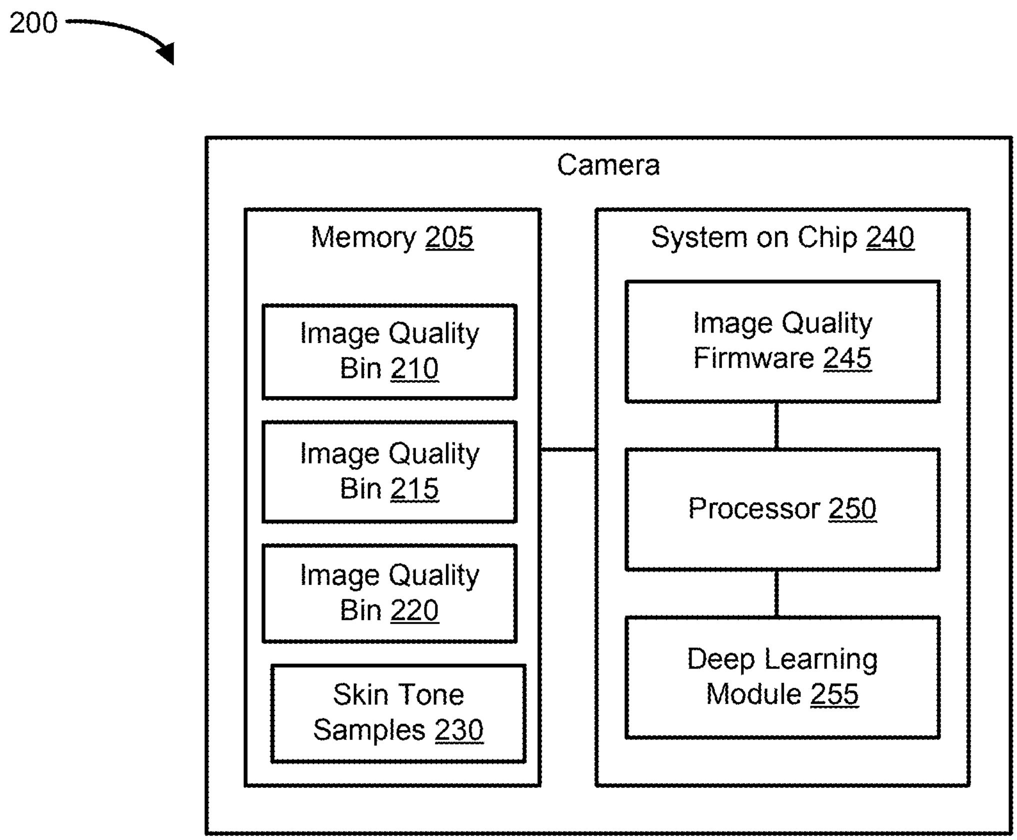
FIG. 2 is a block diagram of a camera configured with adaptive image quality adjustment for different skin tones, according to an embodiment of the present disclosure.

FIG. 2 shows a camera 200 configured with adaptive image quality adjustment for different skin tones. Camera 200, which is similar to camera 124 of FIG. 1, may be integrated into or discreet from a display device. Similarly, the display device may be integrated or discrete from an information handling system that is similar to information handling system 100 of FIG. 1. Camera 200 includes a memory 205 and a SoC 240. Memory 205 includes image quality bins 210, 215, and 220. Memory 205 also includes skin tone samples 230. SoC 240 may include an image quality firmware 245, processor 250, and a deep learning module 255. SoC 240 may be connected to memory 205. The components of camera 200 may be implemented in hardware, software, firmware, or any combination thereof. The components shown are not drawn to scale and camera 200 may include additional or fewer components. In addition, connections between components may be omitted for descriptive clarity.

Camera 200 may be an imaging device that may be used to capture an image or a sequence of images, such as a video stream. These images may be transmitted to a requesting browser or another entity via a network. Camera 200 can be coupled to other components of an information handling system, like via a USB port, a network port, or similar. Images captured by camera 200 are typically displayed at a display device, such as a display monitor or a display panel integrated into a portable information handling system.

Deep learning module 255 may be used to apply big data for skin tone identification, such as whether the skin tone is light, medium, or dark. Deep learning module 255 may also determine the skin tone via a color domain. Deep learning module 255 may be used to analyze a skin tone based on its red/blue tone and gray level or brightness. In one embodiment, samples of different skin tones are obtained and stored as skin tone samples 230. Skin tone samples 230 include a plurality of skin tone samples that may be classified or categorized into light, medium, and dark skin tones, such as shown in a color domain 400 of FIG. 4. As an illustration, the light or fair medium skin tones may be associated with Caucasian skin tones. The medium skin tones may be associated with Asians or tanned skin tones. The dark skin tones may be associated with African skin tones.

Memory 205 may be non-volatile storage memory similar to memory 120 of FIG. 1, such as an electrically erasable programmable read-only memory (EEPROM), a flash memory, a solid-state drive, or similar. Memory 205 may be configured to store image quality bins 210, 215, and 220. Each one of image quality bins 210, 215, and 220 may include a set of image quality settings that are tuned based on three skin tones: light, medium, and dark, respectively. The image quality settings may include settings for color correction, color grading, color balancing, etc. For example, image quality bin 210 may include a set of image quality settings to adjust hue, saturation, brightness, luminance, or other properties of the user's skin tone when the skin tone is determined to be a "light" skin tone. Gamma correction may also be applied to the image, among others. Similarly, image quality bin 215 may include image quality settings to adjust the user's skin tone when the skin tone is determined to be a "medium" skin tone. Accordingly, image quality bin 220 may include image quality settings to adjust the user's skin tone when the skin tone is determined to be a "dark" skin tone.

All or a portion of functionality in the present disclosure may be implemented in SoC 240. In particular, processor 250 may implement instructions included in image quality firmware 245 and/or deep learning module 255. For example, on boot, image quality firmware 245 may utilize a set of default image quality settings to tune a detected user's face and skin tone. Upon detecting a user, image quality firmware 245 identifies the skin tone of a user by calculating various characteristics, such as the skin tone's gray level. Image quality firmware 245 may then apply the image quality settings of the closest image quality bin to the user's skin tone prior to displaying the image on a display device. The application of the image quality settings may be used to automatically modify the user's skin tone in a captured image prior to its display, wherein the image may be a facial image or may include a torso and/or limbs of the user. Modifying the image includes adjusting for over-exposure and under-exposure. For example, the image of the user may be modified to improve color, brightness, contrast, or other properties of the user's skin tone. Image quality firmware 245 may also use image quality settings based on a combination of at least two image quality bins.

Those of ordinary skill in the art will appreciate that the configuration, hardware, and/or software components of camera 200 depicted in FIG. 2 may vary. For example, the illustrative components within camera 200 are not intended to be exhaustive but rather are representative to highlight components that can be utilized to implement aspects of the present disclosure. For example, other devices and/or components may be used in addition to or in place of the devices/components depicted. The depicted example does not convey or imply any architectural or other limitations with respect to the presently described embodiments and/or the general disclosure. In the discussion of the figures, reference may also be made to components illustrated in other figures for continuity of the description.

Figure 3:
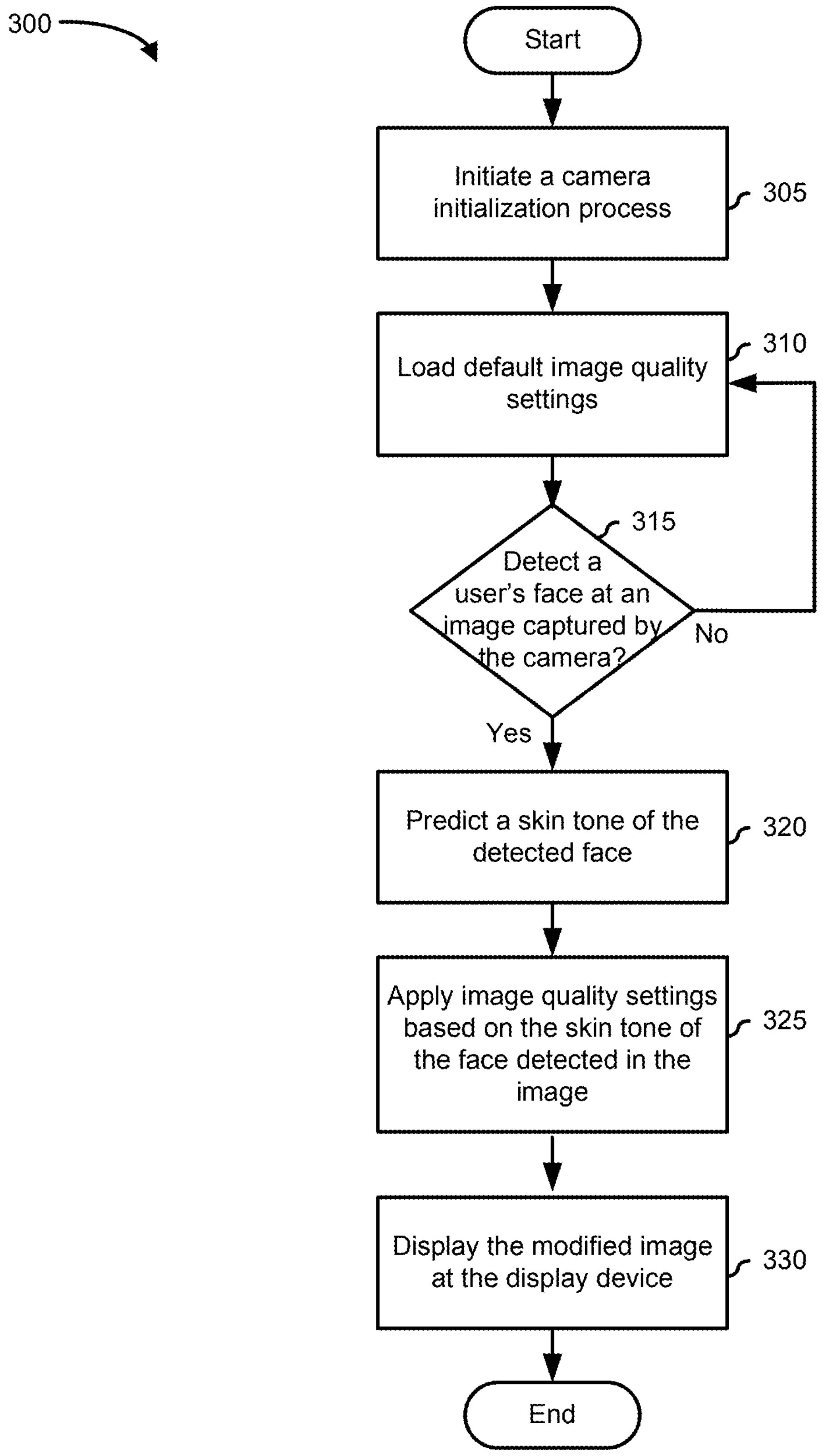
FIG. 3 is a flowchart of a method for adaptive image quality adjustment of different skin tones, according to an embodiment of the present disclosure.

FIG. 3 shows a flowchart of a method 300 for adaptive image quality adjustment of different skin tones. Method 300 may be performed by one or more components of camera 200 of FIG. 2. While embodiments of the present disclosure are described in terms of camera 200 of FIG. 2, it should be recognized that other camera configurations may be utilized to perform the described method. One of skill in the art will appreciate that this flowchart explains a typical example, which can be extended to advanced applications or services in practice.

Method 300 typically starts at block 305 where the camera is initialized, such as when it boots up. The camera may boot up when an information handling system associated with the camera is powered on or booted up. The camera may also be initialized when an application starts utilizing the camera, such as when a teleconferencing application is started. Method 300 may proceed to block 310 where a set of default image quality settings of the camera may be loaded into the memory of the camera. The loaded default image quality settings may also be applied to an image captured by the camera.

Method 300 may proceed to decision block 315, wherein the camera may determine whether it detects a face of a user in an image. The image may be an image frame of a video stream. When there is more than one face detected in the image, method 300 may be configured to identify a primary face, which is typically the one closest to the camera. In another embodiment, the primary face may be the one that occupies the biggest portion of the image. Various techniques may be used in facial detection, such as a deep learning mode, a neural network, etc. If the camera detects the face of a user, then the "YES" branch is taken, and the method proceeds to block 320. If the camera does not detect the face of a user, then the "NO" branch is taken and method 300 loops back to block 310.

Figure 4:
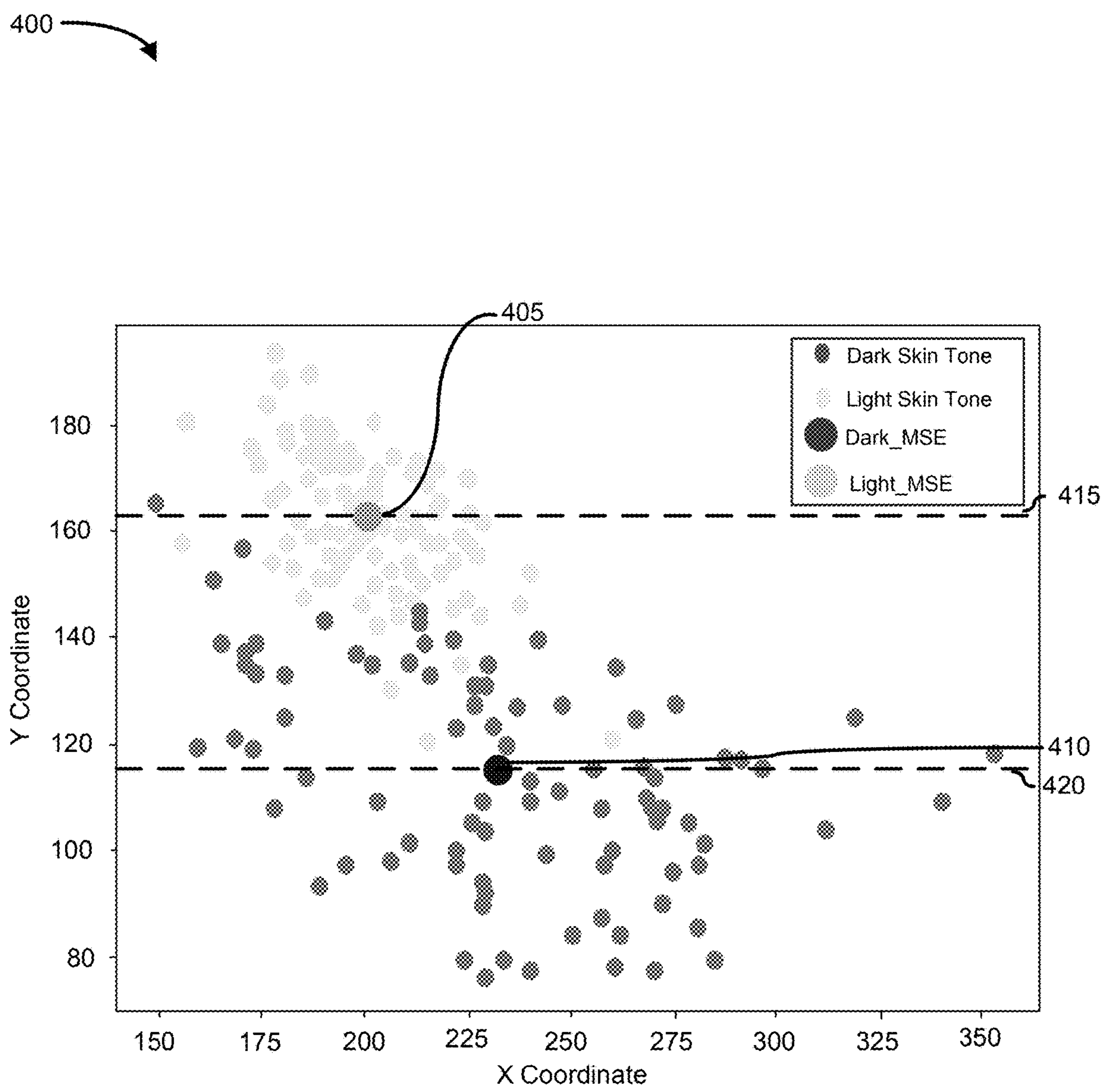
FIG. 4 is a diagram of a color domain with light and dark skin tones, according to an embodiment of the present disclosure.

At block 320, method 300 may predict the skin tone of the detected face based on whether the skin tone falls into one of different zones, such as depicted in FIG. 4. If multiple faces are detected, then the method may predict the skin tone of the primary face. Method 300 may predict the skin tone based on the skin tone's red/blue tones and brightness. Method 300 may use one or more machine-learning techniques to predict the skin tone. For example, a deep learning clustering technique may be used, wherein the skin tone may be predicted to be one of the following skin tone categories: light, medium, or dark. The prediction may be based on whether the skin tone falls within one of the zones. For example, based on an analysis of the detected skin tone, if the detected skin tone falls within a zone 510 of FIG. 5, then the detected skin tone may be categorized as a medium skin tone. Similarly, if the detected skin tone falls within a zone 505 of FIG. 5, then the detected skin tone may be categorized as a light skin tone. Accordingly, if the detected skin tone falls within a zone 515 of FIG. 5, then the detected skin tone may be categorized as a dark skin tone.

The method proceeds to block 325 wherein the camera may apply image quality settings based on the skin tone. In one example, color tuning or adjustment based on a correction matrix may be applied. Camera settings associated with the saturation point may also be tuned or adjusted. In another example, the camera may apply one or more color filters to adjust color, tone, brightness, etc. In particular, if the detected face has a light skin tone, then the camera may apply the image quality settings of image quality bin 210 of FIG. 2. If the detected face has a medium skin tone, then the camera may apply the image quality settings of image quality bin 215. Further, if the detected face has a dark skin tone, then the camera may apply the image quality settings of image quality bin 220.

Figure 6:
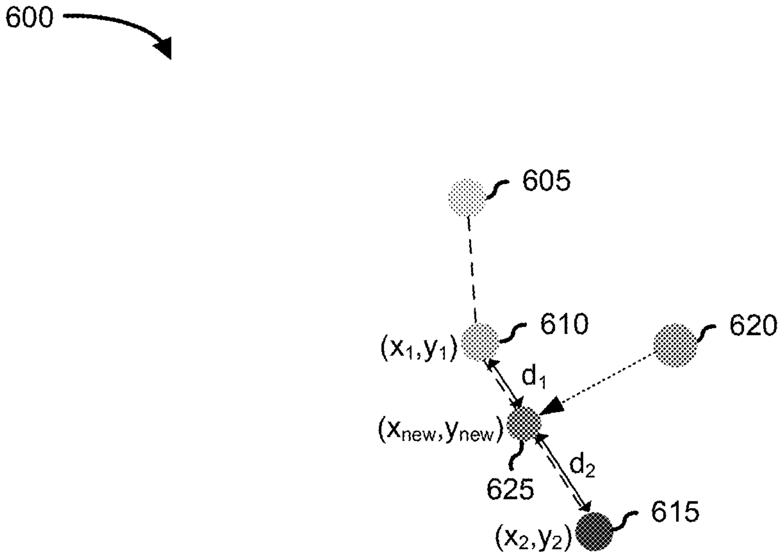
FIG. 6 is a diagram of a skin tone model for determining image quality settings to be applied to an image, according to an embodiment of the present disclosure.

The image quality settings may also be adjusted according to a value of alpha (α) calculated based on a location of a projection of the skin tone on a color model 600 as discussed in FIG. 6. After applying the image quality settings, the method may proceed to block 330 where method 300 may display the modified image at a display device that may be integrated with an information handling system. In another example, the display device may be external to the information handling system, such as a display monitor. The image quality setting may be maintained by the camera until the camera and/or information handling system is powered off. The camera may be re-initialized on the next power on.

FIG. 4 shows a diagram of color domain 400 with light and dark skin tones. Color domain 400 may be a two-dimensional region that can be divided into an x, y grid. The x coordinate indicates the red/blue tones while the y coordinate indicates the gray level of the skin tone in a YUV color space. Samples of light and dark skin tones may be plotted in color domain 400. The location of each one of the sample skin tones may be identified by its x, y coordinates. The skin tones may also be categorized based on the red/blue tones and gray levels in the skin tones.

The light skin tones may be differentiated from the dark skin tones based on their location in color domain 400. A mean squared error of the light skin tones also referred to as a "light_MSE" may be calculated as depicted. A node 405 may represent the light_MSE. Node 405 may be used as an "average" light skin tone, wherein a set of image quality settings in image quality bin 210 of FIG. 2 may be tuned into. The mean squared error of the dark skin tones also referred to as "dark_MSE" may be calculated as depicted. Node 410 may represent the dark_MSE. Node 410 may be used as an "average" dark skin tone, wherein a set of image quality settings in image quality bin 220 of FIG. 2 may be tuned into.

Nodes 405 and 410 may also be used to divide the Y coordinate into three regions. For example, a line 415 may be drawn through node 405 while a line 420 may be drawn through node 410. A portion below line 420 may include dark skin tones while a portion above line 415 may include light skin tones. Medium skin tones may be dispersed between lines 415 and 420.

Figure 5:
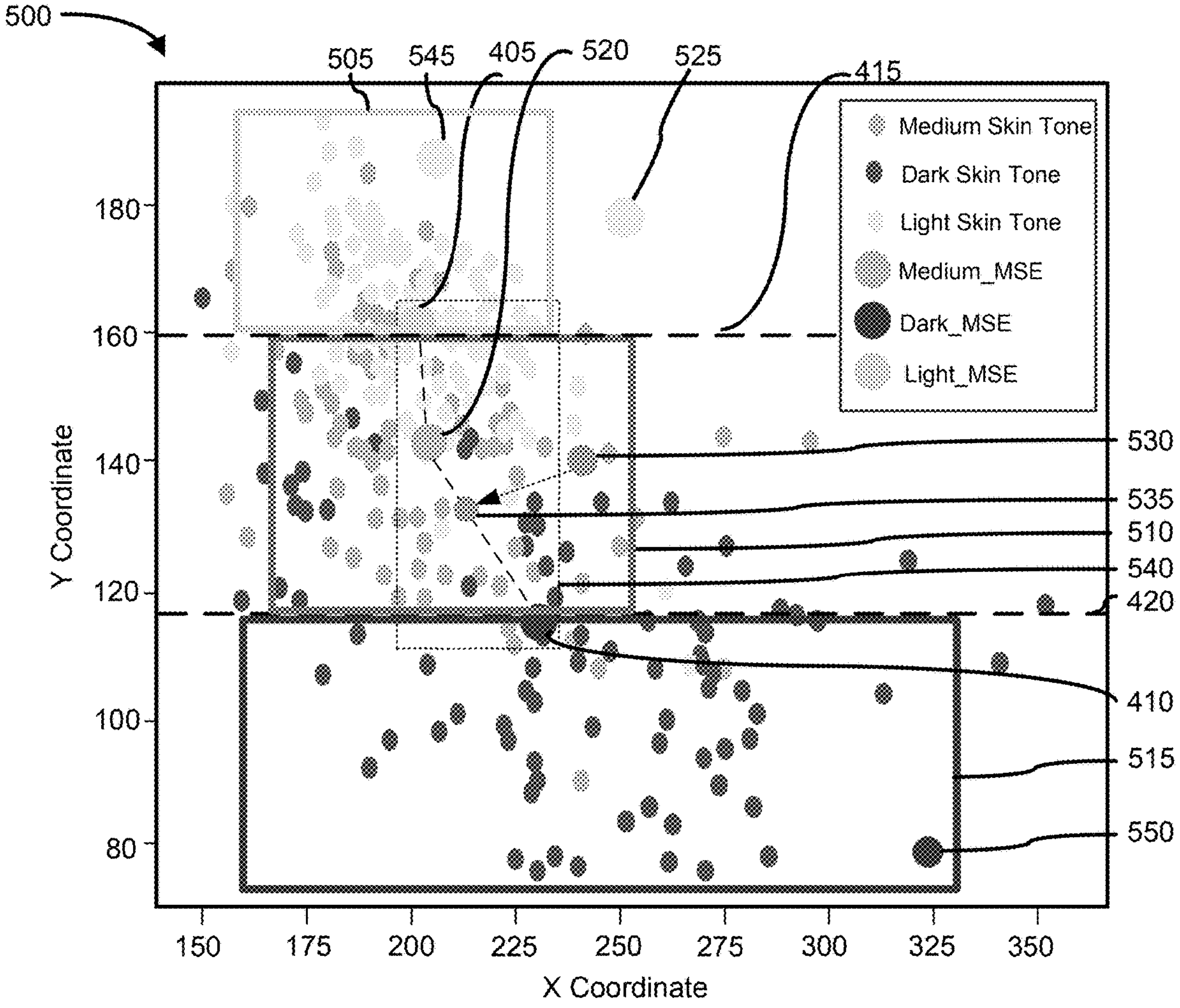
FIG. 5 is a diagram of a color domain with light, medium, and dark skin tones, according to an embodiment of the present disclosure.

FIG. 5 shows a diagram of a color domain 500 with light, medium, and dark skin tones. Color domain 500, which is similar to color domain 400 of FIG. 4, may also be a two-dimensional region with the x and y coordinates. Color domain 500 includes zones 505, 510, and 515. Zone 505 may be associated with light skin tones. Zone 510 may be associated with medium skin tones. Zone 515 may be associated with dark skin tones. The zones may be generated based on lines 415 and 420. For example, to generate zone 505, its left and right edges may first be determined, such that the left and right edges may be perpendicular to line 415 and cover about 80% of the skin tones above line 415 when closed by top and bottom edges. The bottom edge may be located proximate and in parallel to line 415 and connect the bottom portions of the left and right edges. Correspondingly, the top edge may connect the top portions of the left and right edges.

Zone 515 may also be generated similarly to zone 505. For example, the left and right edges of zone 515 may be determined first, such that the left and right edges are perpendicular to line 420 and cover about 80% of the skin tones below line 420 when closed by top and bottom edges. The top edge may be located proximate and parallel to line 420 may connect the top portions of the left and right edges. Correspondingly, a bottom edge may be used to connect the bottom portions of the left and right edges. Zone 510 may be interpolated based on zones 505 and 515, wherein 80% of the skin tone samples between zones 505 and 515 or between lines 415 and 420 may be included in zone 510.

Each zone may be associated with a mean squared error value. For example, zone 505 may be associated with the light_MSE while zone 510 may be associated with the "medium_MSE" and zone 515 may be associated with the dark_MSE. In this example, a node 520 may represent the medium_MSE. Node 520 may be used as an "average" medium skin tone, wherein a set of image quality settings in image quality bin 215 of FIG. 2 may be tuned into. The light_MSE may be associated with image quality bin 210 while and the dark_MSE may be associated with image quality bin 220 of FIG. 2. Thus, an image quality bin may be associated with the categorized skin tone. For example, a light skin tone may be associated with image quality bin 210 while a medium skin tone may be associated with image quality bin 215 and a dark skin tone may be associated with image quality bin 220. Accordingly, the image quality settings included in a particular bin may be used to tune a particular skin tone. For example, the image quality settings included in image quality bin 210 may be used to tune the light skin tone while the image quality settings included in image quality bin 215 may be used to tune the medium skin tones and the image quality settings included in image quality bin 220 may be used to tune the dark skin tones.

A category of the skin tone of a user may be predicted based on whether its coordinates fall within one of zones 505 and 515. For example, if the skin tone is in zone 505, then the skin tone may be categorized as a light skin tone. If the skin tone is in zone 515, then the skin tone may be categorized as a dark skin tone. If the skin tone is in zone 510, then the skin tone may be categorized as a medium skin tone.

In one example, a user with a skin tone 525 with coordinates (250, 180) has been detected. In this example, skin tone 525 can be located above line 415 but outside zone 505. Because skin tone 525 of an image is not located within one of zones 505, 510, and 515, the default image quality settings may be applied to the image prior to displaying the image. In another example, because a skin tone 545 is in zone 505, image quality settings included in image quality bin 210 may be applied to the image prior to displaying the image. In yet another example, because a skin tone 550 of an image falls in zone 515, image quality settings included in image quality bin 220 may be applied to the image prior to displaying the image.

In another example, because a skin tone 530 of an image falls in zone 510, image quality settings to be applied to the image may be interpolated. Node 520 may be used as a reference for the interpolation and utilize the image quality settings associated with zone 510 or zone 515 based on whether an orthogonal projection of skin tone 530 is closer to node 520 or node 410. A coefficient alpha (α) may be calculated and used to adjust values of the image quality settings before they are used to tune the skin tone of the image for display as discussed further in FIG. 6. In particular, the value of α may be calculated based on the location of the orthogonal projection of skin tone 530 into a skin tone model 540. Skin tone model 540 may be created by connecting node 405 with node 520 using a first line. In addition, a second line may be used to connect node 520 with node 410. Prior to the interpolation, the skin tone of the user with the captured image may be projected into skin tone model 540 using orthogonal projection calculations. In one example, a point 535 is a projection of skin tone 530 in skin tone model 540.

FIG. 6 shows a skin tone model 600 for determining image quality settings to be applied to an image with a medium skin tone. Skin tone model 600 which is similar to skin tone model 540 includes nodes 605, 610, and 615. Node 605 is similar to node 405, while node 610 is similar to node 520, and node 615 is similar to node 410. Skin tone model 540 also includes a point 625 which is an orthogonal projection of skin tone 620. In this example, skin tone 620, which is similar to skin tone 530, is in a zone associated with the medium skin tone. In addition, point 625, which is similar to point 535, has coordinates (9, 8), wherein the coordinates were calculated using the orthogonal projection of skin tone 620. Further, node 610 has coordinates (0, 20) also referred to as ($x_1$, $y_1$) while node 615 has coordinates (15, 0) also referred to as ($x_2$, $y_2$).

A first distance (dr) between the coordinates of node 610 and point 625 may be determined, such that $d_1$ is the distance between ($x_1$, $y_1$) and ($x_{new}$, $y_{new}$). The value of α may be calculated as $$\alpha = \frac{d_1}{d_1 + d_2} \text{ and } 1 - \alpha = \frac{d_2}{d_1 + d_2}.$$

Accordingly, $x_{new}=(1-\alpha)\ x_1+\alpha x_2)$, where $0<\alpha<1$. Similarly, $y_{new}=((1-\alpha)y_1+\alpha y_2)$, where $0<1$. In this example, assuming that ($x_{new}$, $y_{new}$) is equal to (9, 8), ($x_1$, $y_1$) is equal to (0, 20), and ($x_2$, $y_2$) is equal to (15, 0) then $d_1=15$ and $d_2=10$. Thus $\alpha=15/25=0.6$ and $1-\alpha=10/25=0.4$, wherein $d_1$ may be associated with α while $d_2$ may be associated with 1−α. Accordingly, $x_{new}=(0.4*0+0.6*15)=9$, where $0<\alpha<1$ and $y_{new}=(0.4*20+0.6*0)=8$, where $0<x<1$.

Nodes 605, 610, and 615 may each be associated with an image quality bin, wherein the image quality bin includes one or more image quality settings to tune a particular category of skin tone. The image quality settings may include color parameters, such as hue, saturation, contrast, and brightness. For example, a skin tone associated with node 610 may have a hue of 32° while a skin tone associated with node 615 may have a hue of 68°. Using the value of a, skin tone 620 may have a hue of 53.6°, based on a calculation: 32°*0.4+68*0.6. Similar calculations may be used to determine values of other image quality settings to be applied to skin tone 530.

One of skill in the art will appreciate that there can be two or more than three zones in the color domain, wherein each zone corresponds to a skin tone. Thus, the skin tones may be categorized based on the number of zones. Accordingly, there may be two or more three image quality bins based on the number of zones, wherein each image quality bin includes at least one image quality setting that may be used to tune the skin tone of a user in a captured image or a video stream prior to its display. For example, instead of three skin tone categories, there may be eight skin tone categories, such as very fair, fair, light, medium, warm, honey, tan, and dark olive. Accordingly, there may be eight image quality bins, one for each skin tone category. For example, an image quality bin associated with very fair skin tones may have image quality settings configured for the very fair skin tones.

Although FIG. 3 shows example blocks of method 300 in some implementations, method 300 may include additional blocks, fewer blocks, different blocks, or differently arranged blocks than those depicted in FIG. 3. Those skilled in the art will understand that the principles presented herein may be implemented in any suitably arranged processing system. Additionally, or alternatively, two or more of the blocks of method 300 may be performed in parallel. For example, block 305 and block 310 of method 300 may be performed in parallel.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

When referred to as a "device," a "module," a "unit," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The present disclosure contemplates a computer-readable medium that includes instructions or receives and executes instructions responsive to a propagated signal; so that a device connected to a network can communicate voice, video, or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes, or another storage device to store information received via carrier wave signals such as a signal communicated over a transmission medium.

A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method comprising:

categorizing, by a processor, samples of skin tones in a color domain into zones;

in response to detecting a facial image by a camera, predicting a skin tone of the facial image that includes determining that the skin tone is in a zone that is one of a first zone, a second zone, or a third zone of the zones in the color domain, wherein the first zone is associated with light skin tones, wherein the second zone is associated with medium skin tones, and wherein the third zone is associated with dark skin tones;

selecting an image quality setting for the skin tone from a plurality of image quality settings including a first image quality setting associated with the first zone, a second image quality setting associated with the second zone, and a third image quality setting associated with the third zone;

generating a tuned facial image by tuning the facial image using the selected image quality setting associated with the zone of the skin tone, wherein the tuning of the facial image includes calculating a coefficient based on a node representing a first mean squared error value of the zone and a node representing a second mean squared error value of another zone of the zones, and wherein the coefficient is calculated based on a first distance from a point associated with the skin tone to the node representing the first mean squared error value and a second distance from the point associated with the skin tone to the node representing the second mean squared error value of the other zone; and displaying the tuned facial image.

2. The method of claim 1, wherein the determining whether the skin tone is in one of the zones is based on a gray level of the skin tone.

3. The method of claim 1, wherein the second zone is interpolated based on the first zone and the third zone.

4. The method of claim 1, further comprising if the skin tone is in the second zone, then tuning the facial image using an image quality setting associated with the medium skin tones prior to displaying the facial image.

5. The method of claim 1, wherein the coefficient is used to adjust a value of the image quality setting before the tuning of the facial image.

6. The method of claim 1, further comprising applying default image quality settings to the facial image.

7. The method of claim 1, wherein the point is an orthogonal projection of the skin tone.

8. An information handling system, comprising:

a processor; and a memory storing instructions that when executed cause the processor to perform operations including:

categorizing samples of skin tones in a color domain into zones;

in response to detecting a user's face in an image by a camera, predicting a skin tone of the user's face in the image that includes determining that the skin tone is in a zone that is one of a first zone, a second zone, or a third zone of the zones in the color domain, wherein the first zone is associated with light skin tones, wherein the second zone is associated with medium skin tones, and wherein the third zone is associated with dark skin tones;

selecting an image quality setting for the skin tone from a plurality of image quality settings including a first image quality setting associated with the first zone, a second image quality setting associated with the second zone, and a third image quality setting associated with the third zone;

generating a tuned facial image by tuning the facial image using the selected image quality setting, wherein the tuning of the facial image includes calculating a coefficient based on a node representing a first mean squared error value of the zone and a node representing a second mean squared error value of another zone of the zones, and wherein the coefficient is calculated based on a first distance from a point associated with the skin tone to the node representing the first mean squared error value and a second distance from the point associated with the skin tone to the node representing the second mean squared error value of the other zone; and displaying the tuned facial image.

9. The information handling system of claim 8, wherein the determining whether the skin tone is in one of the zones is based on a gray level of the skin tone.

10. The information handling system of claim 8, wherein the determining whether the skin tone is in one of the zones is further based on red/blue levels of the skin tone.

11. The information handling system of claim 8, wherein the second zone is interpolated based on the first zone and the third zone.

12. The information handling system of claim 8, wherein the operations further comprise if the skin tone is in the second zone, then tuning the users's face in the image using an image quality setting associated with the medium skin tones prior to displaying the user's face in the image.

13. The information handling system of claim 8, wherein the coefficient is used to adjust a value of the image quality setting prior to the tuning of the image.

14. A non-transitory computer-readable medium to store instructions that are executable to perform operations comprising:

categorizing samples of skin tones in a color domain into zones;

in response to detecting a facial image by a camera, predicting a skin tone of the facial image that includes determining that the skin tone is in a zone that is one of a first zone, a second zone, or a third zone of the zones in the color domain, wherein the first zone is associated with light skin tones wherein the second zone is associated with medium skin tones, wherein the third zone is associated with dark skin tones;

selecting an image quality setting for the skin tone from a plurality of image quality settings including a first image quality setting associated with the first zone, a second image quality setting associated with the second zone, and a third image quality setting associated with the third zone;

generating a tuned facial image by tuning the facial image using the selected image quality setting of the skin tone, wherein the tuning of the facial image includes calculating a coefficient based on a node representing a first mean squared error value of the zone and a node representing a second mean squared error value of another zone, and wherein the coefficient is calculated based on a first distance from a point associated with the skin tone to the node representing the first mean squared error value and a second distance from the point associated with the skin tone to the node representing the second mean squared error value of the other zone; and displaying the tuned facial image.

15. The non-transitory computer-readable medium of claim 14, wherein the determining whether the skin tone is in one of the zones is based on a gray level of the skin tone.

16. The non-transitory computer-readable medium of claim 14, wherein the second zone is interpolated based on the first zone and the third zone.

17. The non-transitory computer-readable medium of claim 14, wherein the operations further comprise if the skin tone is in the second zone, then tuning the facial image using an image quality setting associated with the medium skin tones prior to displaying the facial image.

18. The non-transitory computer-readable medium of claim 14, wherein the coefficient is used to adjust a value of the image quality setting prior to the tuning of the facial image.

19. The non-transitory computer-readable medium of claim 17, wherein the operations further comprise applying default image quality settings to the facial image.

20. The non-transitory computer-readable medium of claim 14, wherein the point is an orthogonal projection of the skin tone.

* * * * *